PULSE GENERATOR

Filed Dec. 12, 1961 3 Sheets-Sheet 1

INVENTOR.
ROBERT C. CLARK

BY Robert R. Strack

ATTORNEY

INVENTOR.
ROBERT C. CLARK
BY
Robert R. Strack
ATTORNEY

June 28, 1966 R. C. CLARK 3,258,605
PULSE GENERATOR
Filed Dec. 12, 1961 3 Sheets-Sheet 3

INVENTOR.
ROBERT C. CLARK
BY
Robert R. Strack
ATTORNEY

United States Patent Office 3,258,605

Patented June 28, 1966

3,258,605

PULSE GENERATOR

Robert C. Clark, Roanoke, Va., assignor to General Electric Company, a corporation of New York Filed Dec. 12, 1961, Ser. No. 158,725

3 Claims. (Cl. 307—88.5)

This invention relates to a pulse generating circuitry and in particular, to pulse generating circuits operative to generate a plurality of output pulses in response to a single input pulse.

There are many techniques in the art for dividing down the initial pulse rate of a train of pulses to develop a train of pulses occurring at some lower rate. It is common, for example, to use a stable crystal oscillator to generate a high frequency signal and to divide the high frequency down with counters to produce a lower, more usable rate while retaining the stability of the original oscillations.

There are far fewer satisfactory techniques available for increasing or multiplying the initial pulse rate of a train of pulses to produce a pulse train having a higher repetition rate than the original pulse train. In this area, probably the most common approach is that used in the handling of sinusoidal signals wherein harmonics of the original signal are generated and tuned circuits are used to select particular harmonics. When dealing with pulses, the latter approach is unsatisfactory because it requires a modification of the signals and also because variations of the original signal frequency render the system ineffective.

From one aspect, pulse rate multiplication, of the nature considered herein, involves the generation of a plurality of output pulses within the same time interval originally containing only a single input pulse. It is not only important to produce a specified number of output pulses for each input pulse, but also, to maintain the interval between each pulse in the output train of preselected duration. Furthermore, it is important that the output pulse rate is a fixed multiple of the input pulse rate irrespective of the particular rate of the input.

An object of the invention is to provide an improved pulse rate multiplication circuit for generating an output pulse train having a repetition rate that is greater than that of an input pulse train.

Another object of the invention is to provide means for generating a predetermined number of pulses with a preselected periodicity in response to the application of a single input pulse.

Still another object of the invention is to provide a system for pulse rate multiplication which is operative throughout a broad range of input repetition rates to generate a predetermined multiple of the input repetition rate.

A specific application of pulse rate multiplication is in conjunction with increasing the resolution of digital tachometers. Such tachometers are characteristically associated with rotating machinery and produce a discrete number of equally spaced output pulses for each complete revolution of the associated machinery. Thus, the repetition rate of these output pulses is commensurate with the speed of the machinery. The combined physical and mechanical limitations of the present digital tachometers impose an upper limit on the number of pulses which may be generated per revolution, and consequently impose a limit upon the resolution of the available information.

In order to increase the resolution of digital tachometers beyond the degree physically practical by modification of the structure thereof, it is advantageous to externally multiply the pulse output of the tachometer. This may be done by generating a predetermined number of pulses for each pulse from the tachometer. The multiple pulses in this instance must be discrete, equally spaced, and of constant number irrespective of the input pulse rate.

Another object of the invention is to provide a system for electronically improving the resolution of digital tachometers.

In accordance with an illustrative embodiment of the invention, the duty cycle of the astable state of a monostable multivibrator is accurately controlled by symmetry control means to develop in response to a triggering pulse train an output signal which has a predetermined time relationship between the positive and negative portions of each cycle. In a simple case, a 50% duty cycle or a 1:1 relationship is established in order to develop a square wave having equal positive and negative portions. The square wave is thereupon differentiated and the pulses generated at each transition of state are combined to produce a pulse train having twice the repetition rate of the triggering pulse train.

By utilizing the teaching of the present invention, a plurality of stages may be employed to permit successive and reliable multiplication of a train of pulses by powers of two. In other applications, by appropriate selection of the duty cycle and use of both the direct and complementary outputs of a plurality of interconnected multivibrators, the input pulse rate may be multiplied by numbers other than powers of two.

The novel features of the invention are set forth with particularity in the appended claims. The invention itself, however, both as to its organization and method of operation, together with further objects and features thereof, may best be understood by reference to the following description taken in conjunction with the drawings wherein:

Figure 1:
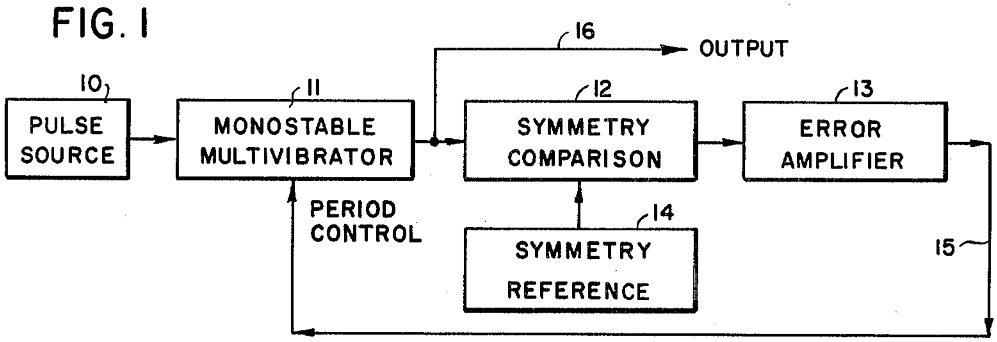
FIG. 1 is a block diagram schematic illustrating the functional elements in an illustrative embodiment of the invention.
Figure 5:
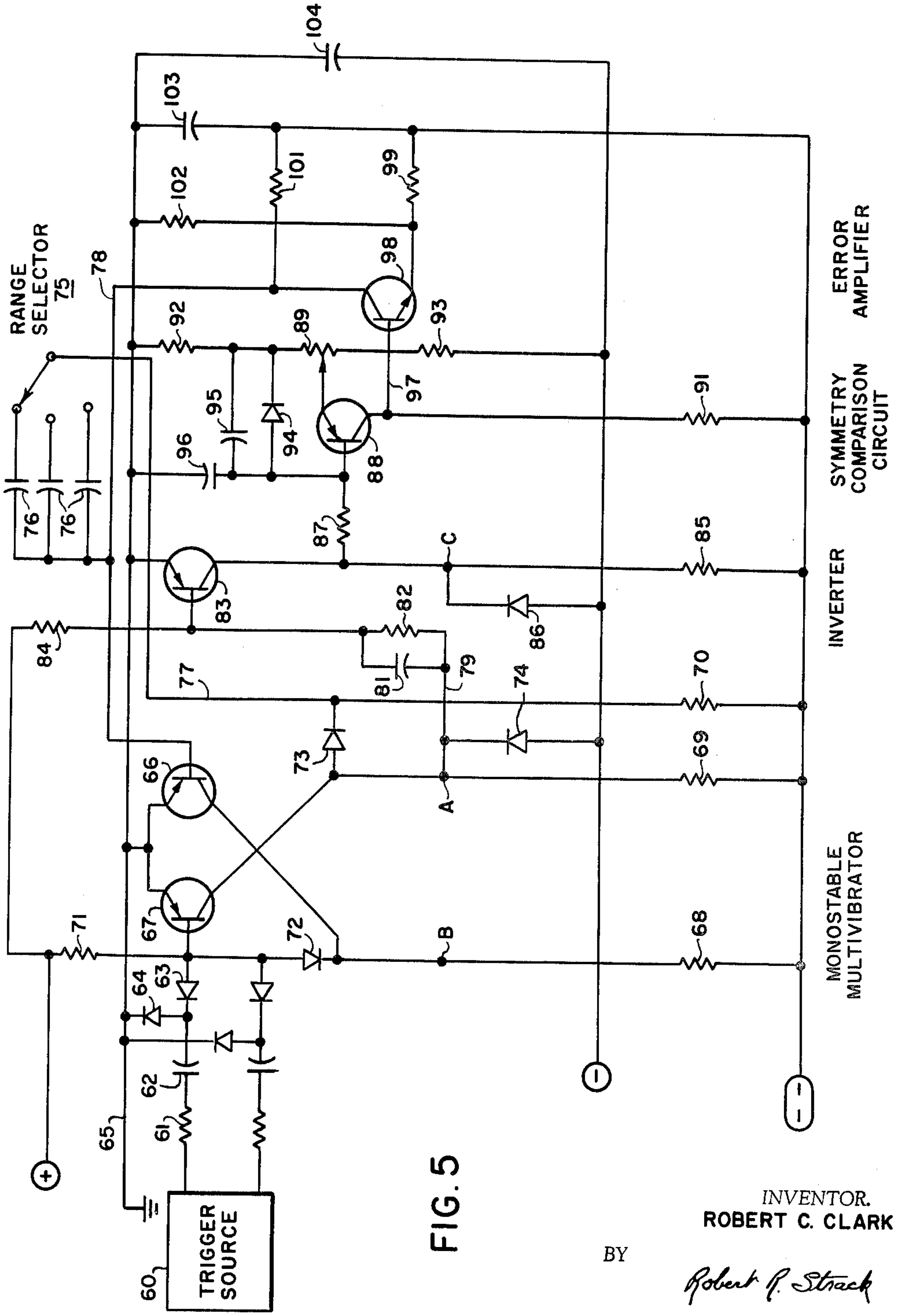
FIG. 5 is a circuit schematic showing a composite circuit operative in response to a train of input pulses to produce a square wave having equal positive and negative portions.

The block diagram in FIG. 1 illustrates the means for making a monostable multivibrator 11 produce a rectangular wave wherein the duty cycle of the astable state is controlled by a symmetry comparison circuit 12. In order to develop a pulse train from the square wave, it is merely necessary to differentiate it to produce a positive or negative pulse at each transition of voltage level. By using both the direct and complementary outputs from the multivibrator (i.e., an output from a similar point of each stage thereof) in conjunction with a gating arrangement, a train of positive or negative pulses may be obtained. FIG. 5, considered in detail hereinafter, illustrates one possible circuit arrangement for obtaining a train of negative pulses.

FIG. 1 illustrates a pulse source 10 driving monostable multivibrator 11. To multiply the input pulse repetition rate by two, the astable period of the multivibrator is adjusted to approximately one-half of the period of the pulse train from pulse source 10. The output of monostable multivibrator 11 is continuously monitored by symmetry comparison circuit 12 which develops an error signal having a magnitude commensurate with the amount by which the astable period deviates from exactly one-half of a full cycle of multivibrator operation. This error signal is amplified in an error amplifier 13 and applied via a feedback loop 15 to control the period of monostable multivibrator 11. When the astable period of monostable multivibrator 11 is exactly equal to one-half of a cycle, comparison circuit 12 generates an error signal that stabilizes the period. When the astable period of monostable multivibrator 11 is not exactly equal to one-half of a cycle, comparison circuit 12 generates an error signal that modifies the timing of the multivibrator to eliminate the deviation. When the circuit is stabilized, the output on lead 16 is a perfect square wave which may be differentiated to yield the desired output pulse train having a frequency twice that of input pulse source 10.

In order to multiply by a number greater than two, the duty cycle of the astable state of monostable multivibrator 11 is adjusted to some amount greater or less than 50% and a plurality of multivibrators are used in combination to produce the ultimate output pulse train. With this operation, symmetry reference 14, in effect, biases symmetry comparison circuit 12 to produce error signals that establish the desired duty cycle in monostable multivibrator 11. Of course, to multiply by powers of two, it is merely necessary to connect an appropriate number of 50% duty cycle multivibrators in tandem and to differentiate the output of the final stage.

Before considering a specific circuit for accomplishing the functions illustrated by blocks in FIG. 1, several circuits for performing individual functions will be considered. In the circuits to be considered, it should be understood that the specific elements illustrated have been selected for discussion purposes only. For example, the particular type of transistor used is within the discretion of one skilled in the art. Of course, potential values must be chosen which are compatible with the selected elements. In the circuit schematics, "(+)" and "(−)" symbols are used to denote voltage polarity. Increased magitudes of voltage in any particular polarity are indicated by an increasing plurality of symbols. Thus, "(++)" represents a voltage greater than (+); however, no specific quantity of difference should be implied.

Figure 2:
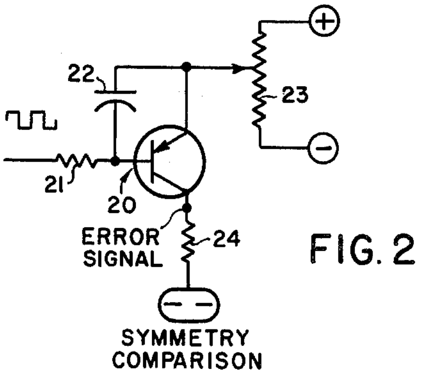
FIG. 2 is a circuit schematic of a symmetry comparison circuit for use in controlling the duty cycle of a monostable multivibrator.

FIG. 2 illustrates a means for developing error signals that have a magnitude commensurate with a deviation of an input signal from a predetermined symmetry condition. The circuit comprises a PNP transistor 20 having its emitter connected to the slider of a potentiometer 23 which is supplied by a voltage having the illustrated polarity. The collector of transistor 20 is connected via a resistor 24 to a negative potential (−−) to develop a voltage commensurate with the signal on the base thereof. The inclusion or exclusion of resistor 24 depends upon the nature of error signal desired. A capacitor 22 is connected between the base and emitter electrodes of transistor 20 to serve as a short time storage element, as described hereinafter, and a resistor 21 couples input signals to the base electrode.

By setting potentiometer 23 to furnish a voltage on the slider thereof that is between the positive and negative excursions of an input signal, the conduction of transistor 20 is made dependent upon the extent to which the input is positive or negative with respect to the slider voltage. When the input signal is a rectangular wave and the voltage on the slider is adjusted midway between the positive and negative amplitudes, the conduction of transistor 20 is commensurate with the amount by which the negative portion exceeds the positive portion.

When a rectangular wave is applied via resistor 21 to the base electrode of transistor 20, capacitor 22 is charged toward the peak amplitude of the portion of square wave being applied. Initially, during the positive portion of the cycle, transistor 20 is relatively back-biased and consequently, little current flow occurs therethrough. During the negative portion of the cycle, transistor 20 is relatively forward-biased and a relatively large current flow is experienced. Thus, respective portions of the cycle will oppositely affect the current between the emitter and collector electrodes. On successive cycles, capacitor 22 in combination with resistor 21, acts as an integrating circuit and a stable bias level is attained which represents the amount by which the dominant portion of the rectangular wave exceeds the minor portion. The stable bias level causes a constant conduction level in transistor 20 which is commensurate with the symmetry or lack of symmetry of the input signal. By adjusting the slider of potentiometer 23, the degree of conduction of transistor 20 for any desired condition of symmetry may be established.

Figure 3:
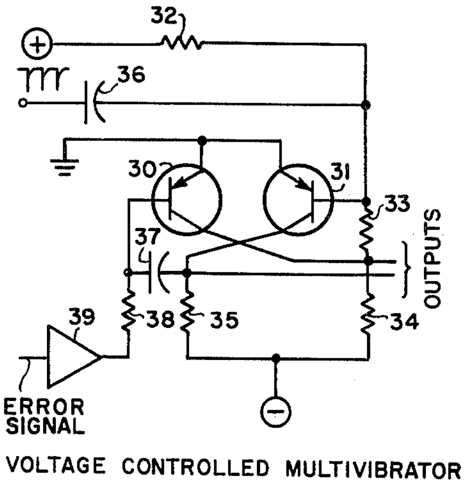
FIGS. 3 and 4 are circuit schematics of typical monostable multivibrators of a type usable in the illustrated embodiment.
Figure 4:
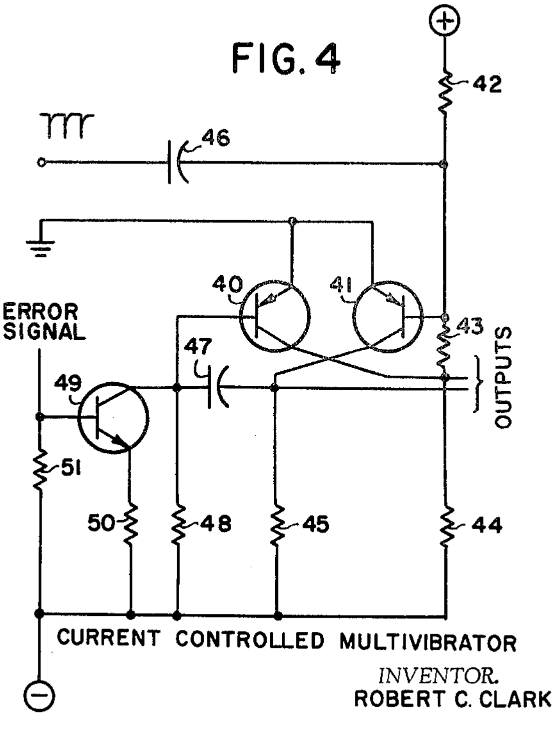

The circuit in FIG. 2 is thus operative to generate a signal indicative of the symmetry of a rectangular wave. When this rectangular wave is generated by an astable multivibrator, the object is to control the time constants of the multivibrator to produce a waveform of the desired shape. FIGS. 3 and 4 contain circuit schematics of astable multivibrators and several techniques whereby the error signals from the symmetry control circuit may be used to control them.

FIG. 3 illustrates means for controlling the astable period of a monostable multivibrator by means of a control voltage. Such a voltage, for example, may be developed across resistor 24 in FIG. 2. The monostable multivibrator in FIG. 3 is conventional and consists of PNP transistors 30 and 31 having their emitters connected to ground and their collectors connected via resistors 34 and 35 respectively to a negative potential (−). The multivibrator is maintained in a stable condition with transistor 30 conducting and transistor 31 non-conducting. A voltage divider comprising serially connected resistors 32, 33, and 34, connected between a positive (+) and negative (−) source, provides reverse bias on transistor 31 via a connection from the junction between resistors 32 and 33 to the base of transistor 31. Transistor 30 is maintained forward-biased by a negative voltage from a voltage amplifier 39 which is connected to the base thereof by a resistor 38. A coupling capacitor 37 is connected between the collector of normally nonconducting transistor 31 and the base of normally conducting transistor 30 in order to permit switching and control the timing of the astable period.

Each cycle of operation occurs in response to a negative triggering pulse applied via coupling capacitor 36 to the base of transistor 31. This turns transistor 31 "on" by driving it into conduction. When transistor 31 is turned on, the increase of potential upon its collector is coupled through capacitor 37 to the base of transistor 30 turning it "off." The period during which transistor 30 remains turned off, i.e., the astable period, is determined by the time required for capacitor 37 to recharge sufficiently to forward-bias transistor 30. The recharge circuit comprises voltage amplifier 39, resistor 38, and capacitor 37. Thus, the magnitude of voltage developed at the output of voltage amplifier 39 will determine the time at which transistor 30 resumes conduction. Voltage amplifier 39 may take any of the forms well known in the art and, therefore, is illustrated in block form only. Functionally, the amplifier may be responsive to an error signal such as developed by the circuit in FIG. 2 to produce a voltage commensurate therewith for application to the base of transistor 30. In other words, the timing of the monostable multivibrator illustrated in FIG. 3 is directly controlled by varying the voltage applied to the base of normally conducting transistor 30.

The outputs from the monostable multivibrator in FIG. 3 may be extracted from either, or both, collector electrodes. The signals on the collector electrodes are direct complements of one another, the waveform of potential on the collector of transistor 30 being the opposite of the potential on the collector of transistor 3. Obviously, only one of these outputs need be applied to a symmetry comparison circuit such as that of FIG. 2 in order to develop the required error signal. Of course, the specific comparison circuit shown (using PNP transistor 20) will respond properly to only one output. Both outputs may be used to develop the output pulse train.

Because of the exponential characteristic of the recharge of capacitor 37 in FIG. 3, several practical limitations are imposed upon a voltage controlled multivibrator. Experimentation indicates, for example, that the range of control possible with a circuit of the nature described in FIG. 3 is not as great as the range of control possible with an arrangement of the nature described in FIG. 4.

FIG. 4 illustrates a circuit in which the error signal controls the multivibrator period by means similar to development of a controlled current source. The circuit in FIG. 4 is similar to that described in FIG. 3 and is stable with transistor 40 conducting and transistor 41 nonconducting. The distinction between the circuits arises from NPN transistor 49, having base resistor 51 and emitter resistor 50, which is added in order to effectively provide a variable current supply for recharging coupling capacitor 47 and thereby control the duration of the astable period. Transistor 49 is biased by an error signal such as that developed by the symmetry comparison circuit of FIG. 2, and consequently, the collector-emitter impedance thereof is directly proportional to the error signal. From another aspect, the current flow through transistor 49 during recharge of coupling capacitor 47 is controlled by the error signal and hence provides a current source of variable magnitude commensurate with the deviation from the desired symmetry conditions. The characteristics of the circuit in FIG. 4 are extremely linear and it has been found capable of furnishing astable periods having a forty to one ratio with respect to a full cycle.

The range of current control in FIG. 4 can be increased further by taking advantage of another element of multivibrator design. During the latter half of the operating cycle when transistor 41 is in an off condition, capacitor 47 must complete recharging via resistor 45. When the recharging current amplitude via the control circuit approaches the magnitude of the average current through resistor 45, capacitor 47 has insufficient time to achieve full charge amplitude and consequently, the first half period of the subsequent cycle is inherently shortened. With this charge limit condition, the gain becomes very high and the range of regulation is extended. The exact amount it is extended depends upon the voltage operating range of capacitor 47 and upon the nature of the storage effects in transistor 40.

The function of resistor 48 in FIG. 4 should also be understood. If the circuit is operated near a zero pulse rate input, no current will be supplied to hold transistor 40 in an on condition as a stable state, and consequently, the multivibrator will free run in a jittery fashion. To prevent this, a minimum base current level is established in transistor 40 by resistor 48. Beyond this minimum level, transistor 49 is cut off and the output of the multivibrator is asymmetrical on its lower end. The lower range may be extended by changing the value of capacitor 47.

FIG. 5 is a circuit schematic combining the symmetry comparison circuit of FIG. 2, the current controlled multivibrator circuit of FIG. 4, and several other circuits to provide a multiplier of the type illustrated by FIG. 1. The circuit in FIG. 5 yields complementary controlled rectangular waveforms at points A and C in the center of the sheet. These rectangular waveforms may be differentiated to provide a desired output pulse train.

In FIG. 5, means are illustrated for directly driving the circuit with a multivibrator circuit similar to those hereinbefore considered. Trigger source 60 may thus be considered to comprise a multivibrator such as those illustrated in FIGS. 3 and 4. The two output leads from trigger source 60 represent the two outputs which may be derived from the multivibrator at each collector electrode, for example. Identical networks interconnect each trigger source output with the base electrode of a transistor 67. Considering one such network, it comprises serially connected resistor 61, capacitor 62, and rectifier 63. A second rectifier 64 is connected to clamp positive signals at a zero or ground level. Rectifier 63 is oriented to pass negative signals from trigger source 60 to the base of transistor 67. The RC combination of resistor 61 and capacitor 62 act as a differentiator and, therefore, if a rectangular waveform appears at the upper output from trigger source 60, only the negative pulses resulting from differentiation of the negative voltage excursions appear at the base of transistor 67. Because the two outputs from trigger source 60 are complementary, it is apparent that when a square wave is produced, the signal applied to the base of transistor 67 is a train of negative pulses having a repetition rate equal to twice the frequency of the square wave.

In general, the circuit in FIG. 5 comprises: trigger source 60, a monostable multivibrator similar to that described in connection with FIG. 4, an inverting amplifier, a symmetry comparison circuit similar to that described in connection with FIG. 2, and an error amplifier similar to that described in conjunction with FIG. 4.

The monostable multivibrator in FIG. 5 comprises PNP transistors 66 and 67 connected in a circuit substantially the same as that shown in FIG. 4. Rectifiers 72 and 73 have been added to improve switching characteristics and rectifier 74 has been added to clamp the negative level of the output waveform to (—). The single coupling capacitor 47 in FIG. 4 has been replaced by a plurality of capacitors 76 and a selector switch 75 in order to adjust the range of astable duty cycle in accordance with the particular multiplication being performed and the particular input frequency handled.

When no input signal is applied, the monostable multivibrator of FIG. 5 resides in a stable state with transistor 66 conducting and transistor 67 nonconducting. Under these conditions, point A is at approximately (—) volts and point B is at approximately ground potential. The application of negative triggering pulses to the base of transistor 67 creates a forward-bias between the emitter and base electrodes thereof and it becomes conductive. The resultant increase in potential upon the collector of transistor 67 is transmitted via suitably oriented rectifier 73, conductor 77, range adjusting selector switch 75, and a capacitor 76 to the base of transistor 66. This increase in potential reverse-biases normally conducting transistor 66 and cuts it off. As discussed hereinbefore, the cut-off period of transistor 66 is directly determined by the time required for the particular capacitor 76 connected to recharge to a voltage at which transistor 66 is again forward-biased. At this time, point A is at approximately ground potential and point B is negative by an amount determined by the conductive base drop of transistor 66 and the conductive drop of rectifier 72.

When transistor 66 resumes conduction, the level of voltage on the base of transistor 67 is raised to approximately ground potential and it is cut off. Thus, in response to each negative input pulse, rectangular waves are produced having limits of 0 and (—) volts; the waveform at point A being the inverse or complement of the waveform at point B. However, the voltage swing at point B is less than that of point A. To develop a more appropriate inverse signal, the voltage at point A is inverted. These waveforms at points A and C may be differentiated and applied to succeeding stages as trigger source 60 illustrates, or these waveforms may be used to develop pulse trains that have repetition rates that are multiples of the input frequency.

To control the output symmetry, the output signal from point A is coupled over conductor 79, and coupling resistor 82 and capacitor 81 in parallel to the base of PNP transistor 83. Transistor 83 functions to invert and amplify the signal, developing an output at point C which is the inverse of that appearing at point A. The circuit comprising transistor 83 is conventional, and includes biasing by a resistor 84 connected between the base electrode and (+) and a resistor 82 connected between the base electrode and point A which is clamped by rectifier 74 to a maximum negative voltage of (—). The emitter of transistor 83 is connected via conductor 65 to ground and its collector is connected via resistor 85 to (— —). Point C, at the collector of transistor 83, is clamped to a maximum negative voltage of (—) by suitably oriented rectifier 86.

The output at point C is utilized to control the symmetry comparison amplifying circuit which comprises PNP transistor 88. This circuit is similar to that described in connection with FIG. 2. The output of the mutlivibrator drives the symmetry comparison circuit via the inverter and a resistor 87 which is connected to the base of transistor 88. The voltage on the emitter of transistor 88 is controlled by symmetry reference potentiometer 89 which is serially connected between ground and (—) in the circuit including resistor 92, potentiometer windings 89, and resistor 93. A rectifier 94, having its anode connected to the base of transistor 88 and its cathode connected to the upper terminal of potentiometer 89 serves to clamp the base voltage at a point no higher than the upper terminal of potentiometer 89. Capacitors 95 and 96 are included to facilitate the integrating function described in connection with capacitor 22 in FIG. 2. These capacitors are connected respectively between the base of transistor 88 and ground and the upper terminal of potentiometer 89. The collector of transistor 88 is connected via resistor 91 to (— —) and also to the base of error amplifier 98 via conductor 97. As previously described, variation of the slider of potentiometer 89 determines the symmetry criteria of the output waveform and a signal is developed across resistor 91 that is commensurate with the deviation from such criteria.

The error amplifier comprising NPN transistor 98 functions as a current source in the same manner described in conjunction with FIG. 4. The symmetry comparison circuit establishes the degree of conduction of transistor 98 and in accordance with this degree of conduction, the time for recharging of capacitors 76 in the range adjusting circuit is determined. The error amplifier has its collector connected via resistor 101 to (— —) and its emitter connected via resistor 99 to (— —). A filter capacitor 103 by-passes any alternating ripple voltage to ground potential. It may also be noted that a capacitor 104, located on the right of the drawing, filters any ripple on the (—) source to ground on conductor 65.

Considering a typical sequence of operation, a negative input pulse applied to the base of PNP transistor 67 triggers it into an on state and raises point A to approximately zero volts. The approximately zero volts of point A is applied to the base of PNP transistor 83 turning it off and consequently developing a voltage of (—) at the collector thereof. The (—) signal is applied to the base of PNP transistor 88 and charges capacitor 95 while simultaneously affording a forward-bias to transistor 88. The forward-bias is effective to render transistor 88 strongly conductive and therefore increases the voltage at the base of NPN transistor 98. Under the influence of this increased forward-bias, transistor 98 furnishes a relatively low impedance between its collector and emitter electrodes for the recharge path between capacitors 76 to the (— —) source. Capacitors 76 are, therefore, recharged in a circuit comprising the lower terminals thereof, conductor 78, the collector-emitter path of transistor 98, resistor 99, and the (— —) source.

The particular impedance of the recharge path depends upon the conduction level of transistor 98. Because the recharge path has an impedance (transistor 98) controlled directly by the symmetry comparison circuitry, the period of the astable state is controlled directly by the symmetry comparison circuitry. Capacitors 76 recharge in the aforedescribed path until the voltage on the base of transistor 66 is sufficiently negative to render it conductive, at which time the monostable multivibrator switches back to its stable condition wherein transistor 66 is on and transistor 67 is off.

The stable condition continues until the subsequent trigger pulse arrives. During this stable condition, it will be noted that the output at point A is at a level of (—) volts. This voltage is transmitted through the inverter comprising transistor 83 as a relatively zero voltage and this in turn is effective to discourage conduction of symmetry comparison transistor 88. The extent to which such conduction is discouraged depends upon the duration of the negative voltage at point A and the charge upon capacitor 95 as a result of the previous portion of operation. As described in connection with FIG. 2, after several cycles the voltage appearing at point C is effectively integrated and applied to control the symmetry comparison circuit. This in turn controls the conduction state and impedance of the error amplifier to correct any deviation in operation from a desired condition.

Figure 6:
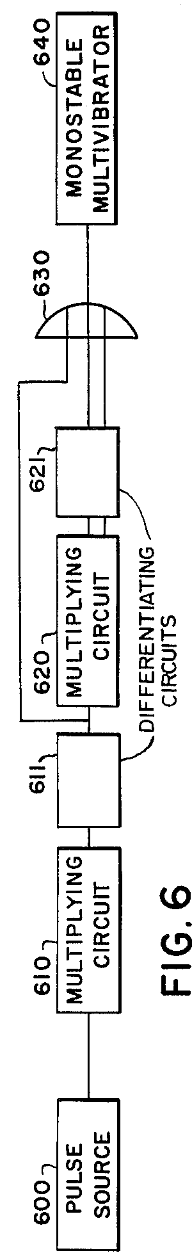
FIG. 6 is a block diagram schematic illustrating a typical use of the invention for multiplying an incoming pulse rate by a factor of three.

FIG. 6 is a block diagram schematic of an arrangement for multiplying an input pulse rate by a factor of three. In this arrangement, two multiplying circuits 610 and 620 are connected in tandem, each being controlled to have an astable period equal to one-third of a full cycle of the input pulse rate. The multiplying circuits may, for purposes of description, be developed as shown in FIG. 5; appropriate outputs being selected from points A and C shown in FIG. 5, and the symmetry comparison circuit being adjusted to yield an astable period equal to one-third of a full cycle.

The multiplying circuits are arranged in tandem with the output of the first circuit 610 being used to initiate the astable state of the second circuit 620 upon cessation of its astable period. The effect of this interconnection is to create voltage transitions, i.e., changes of voltage level, at three equally spaced times during a full period of the input signal. As well understood, these voltage transitions may be differentiated to generate pulses and thereafter, particular polarities of pulses may be selected to obtain the desired output train. The system depicted in FIG. 6 illustrates the use of a single output from multiplying circuit 610 in conjunction with the complementary outputs of multiplying circuit 620 in order to obtain three positive going voltage transitions for application to a logic OR gate 630. In the block schematic, differentiating circuits 611 and 621 are shown, such differentiating circuits, for example, may be developed with a resistor and capacitor serially connected to a properly oriented rectifier as shown in FIG. 5. Monostable multivibrator 640 is triggered by the output of OR gate 630 in order to furnish well-shaped output pulses of fixed duration.

Figure 7:
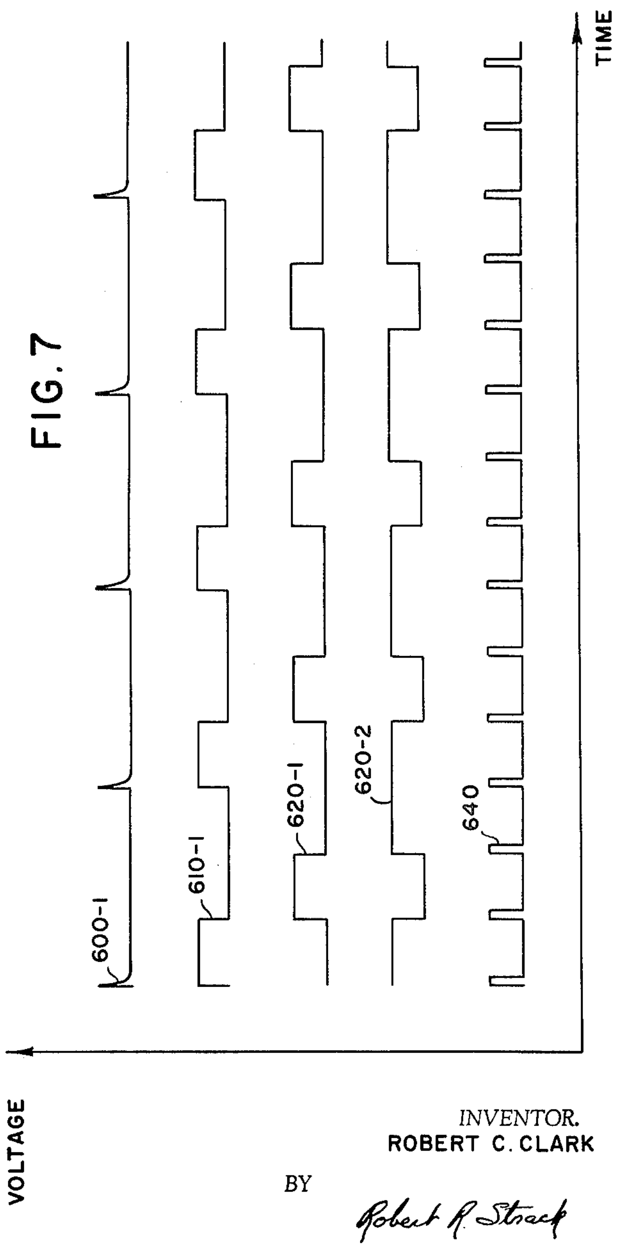
FIG. 7 contains a plurality of waveforms appearing at various points in the schematic of FIG. 6.

FIG. 7 contains five illustrative waveforms of the nature found in the system of FIG. 6. These waveforms are plotted with voltage magnitude as the ordinate and time as the abscissa. The input pulses developed by pulse source 600 are illustrated by waveform 600–1. These input pulses are applied to multiplying circuit 610 which produces an output illustrated by waveform 610–1. Waveform 610–1 is differentiated and applied to the proper input terminal of multiplying circuit 610 to initiate its astable state and thereby produce waveforms 620–1 and 620–2. The latter two waveforms are obtained by extraction from the complementary outputs of multiplying circuit 620. By utilizing the positive voltage transitions of each of waveforms 610–1, 620–1, and 620–2, pulses are developed that are equally spaced and occur at a rate equal to three times that of the input pulse train 600–1. Logic OR gate 630 is driven by the differentiated output pulses and provides a train of pulses for triggering monostable multivibrator 640.

The system illustrated in FIG. 6 is merely one of many which may be developed by utilizing the symmetry comparison and control circuitry of the instant invention. Of course, the described circuitry constitutes particular embodiments of the invention. It will be understood that it is not wished to be limited thereto since modifications can be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. In a system for generating a fixed plurality of equally spaced pulses in response to single pulses, a first multiplying circuit comprising means for producing a first rectangular wave having first and second voltage levels and having a fixed ratio between the durations of each voltage level thereof during a cycle, the beginning of each of said cycles being initiated by said pulse, a second multiplying circuit responsive to said first rectangular wave for producing a second rectangular wave having first and second voltage levels having a fixed ratio between the durations of each voltage level thereof during a cycle, means for causing the beginning of each of said latter cycles to be initiated upon the completion of the first one of the voltage levels of said first rectangular wave, and means responsive to selected voltage level transitions of said first and second rectangular wave to yield a plurality of equally spaced pulses.

2. An arrangement according to claim 1 wherein said last named means comprises means for separately differentiating a given polarity transition of each of said first and second rectangular waves to provide separate differentiated pulses and means for combining said separate differentiated pulses.

3. A system for generating a fixed plurality of equally spaced pulses in response to a single pulse comprising, a first monostable multivibrator having a controlled astable period initiated by said single pulse and providing a direct and complementary output, means responsive to the output of said first multivibrator to produce a signal representative of the difference in duration between the astable period and the stable period of said monostable multivibrator, means for applying said signal to said first multivibrator to control said astable period in accordance with a predetermined difference in duration between said astable period and said stable period, a second monostable multivibrator controlled by said first multivibrator having a controlled astable period initiated upon termination of the astable period of said first multivibrator, means responsive to the outputs of said first and second multivibrators for generating pulses at each transition of voltage level thereof, and means for selectively combining said generated pulses to produce a plurality of equally spaced pulses.

References Cited by the Examiner

UNITED STATES PATENTS

| | | | |
|---|---|---|---|
| 2,390,608 | 12/1945 | Miller et al. | 328—38 |
| 2,589,334 | 3/1952 | Browne | 328—38 X |
| 2,747,096 | 5/1956 | Brockway | 328—38 |
| 2,774,872 | 12/1956 | Howson | 331—27 |

ARTHUR GAUSS, *Primary Examiner.*

JOHN W. HUCKERT, *Examiner.*

J. JORDAN, *Assistant Examiner.*